(12) United States Patent
Ochiai et al.

(10) Patent No.: US 7,687,957 B2
(45) Date of Patent: Mar. 30, 2010

(54) MAGNET FIXING STRUCTURE FOR ELECTRIC ROTARY MACHINE

(75) Inventors: Takayuki Ochiai, Kiryu (JP); Satoru Negishi, Kiryu (JP)

(73) Assignee: Mitsuba Corporation, Gunma (JP)

( * ) Notice: Subject to any disclaimer, the term of this patent is extended or adjusted under 35 U.S.C. 154(b) by 127 days.

(21) Appl. No.: 11/631,939

(22) PCT Filed: Jul. 6, 2005

(86) PCT No.: PCT/JP2005/012457

§ 371 (c)(1),
(2), (4) Date: Jul. 31, 2007

(87) PCT Pub. No.: WO2006/008964

PCT Pub. Date: Jan. 26, 2006

(65) Prior Publication Data

US 2008/0048517 A1    Feb. 28, 2008

(30) Foreign Application Priority Data

Jul. 16, 2004 (JP) .............................. 2004-210085

(51) Int. Cl.
*H02K 21/12* (2006.01)
*H02K 1/27* (2006.01)

(52) U.S. Cl. .............................. 310/156.08; 310/156.12; 310/156.19; 310/156.21; 310/156.23; 310/156.31; 310/156.75; 310/156.77; 310/156.28; 310/156.29

(58) Field of Classification Search ............ 310/156.08, 310/156.21, 156.23, 156.31, 156.75, 156.77, 310/156.12, 156.19, 156.28, 156.29, 154.14, 310/51, 156.16, 156.22, 156.27; *H02K 1/27*
See application file for complete search history.

(56) References Cited

U.S. PATENT DOCUMENTS 3,979,821 A * 9/1976 Noodleman .................. 29/598

(Continued)

FOREIGN PATENT DOCUMENTS

JP    05-153745    6/1993

(Continued)

OTHER PUBLICATIONS

JP2001-268830AB.pdf : Sato et al (JP 2001-268830, English Abstract) Sep. 2001.*

(Continued)

*Primary Examiner*—Quyen Leung
*Assistant Examiner*—John K Kim
(74) *Attorney, Agent, or Firm*—Wenderoth, Lind & Ponack, L.L.P.

(57) ABSTRACT

Holder anchoring grooves are arranged on the outer periphery of a rotor core so as to extend axially. A holder arm having a substantially T-shaped cross section is fitted to each of the holder anchoring grooves. The holder arm has a main body section, an engaging projection and magnet holding pieces. The engaging projection is engaged with the corresponding one of the holder anchoring grooves. Each of the magnet holding pieces includes a first contact section, a second contact section and a non-contact area. A magnet containing section is defined by the magnet holding pieces that are located vis-à-vis relative to each other of any two adjacently located holder arms and the outer peripheral surface of the rotor core. In the magnet containing sections, a rotor magnet is press fitted and anchored from the shaft direction. Thus, there is provided a magnet fixing structure that can accurately anchor magnets to a rotor core or the like at low cost.

10 Claims, 5 Drawing Sheets

U.S. PATENT DOCUMENTS

| | | | | |
|---|---|---|---|---|
| 4,219,752 A | * | 8/1980 | Katou | 310/156.19 |
| 4,587,449 A | * | 5/1986 | West | 310/154.27 |
| 4,591,749 A | * | 5/1986 | Gauthier et al. | 310/156.19 |
| 5,237,737 A | * | 8/1993 | Zigler et al. | 29/598 |
| 6,700,288 B2 | * | 3/2004 | Smith | 310/216.023 |
| 6,844,646 B1 | * | 1/2005 | Werson et al. | 310/156.16 |
| 6,933,645 B1 | * | 8/2005 | Watson | 310/156.09 |

FOREIGN PATENT DOCUMENTS

| | | |
|---|---|---|
| JP | 09-019091 | 1/1997 |
| JP | 11-332145 | 11/1999 |
| JP | 2000-333394 | 11/2000 |
| JP | 2001-037122 | 2/2001 |
| JP | 2001268830 A * | 9/2001 |
| JP | 2003-264948 | 9/2003 |

OTHER PUBLICATIONS

JP_2001268830_A-H : Sato (JP 2001/268830, English abstract), 2001.*

* cited by examiner

MAGNET FIXING STRUCTURE FOR ELECTRIC ROTARY MACHINE

TECHNICAL FIELD

This invention relates to a magnet fixing structure of an electric rotary machine such as a motor and an electric generator. More particularly, the present invention relates to a magnet fixing structure of an electric rotary machine that can rigidly hold a magnet without using any adhesive agent.

BACKGROUND ART

A permanent magnet field system is conventionally used in many small electric motors and electric generators. In this case, a magnet is often rigidly fitted to a stator or a rotor by means of adhesive. After bonding the magnet to the rotor or the stator, a magnet cover is mounted thereon in most cases. For example, many motors being used for electric power steering systems (to be referred to simply as EPS hereinafter) are provided with a magnet cover that is arranged around the rotor magnet in order to prevent the motor from falling into a locked condition when the magnet comes off or becomes broken.

Known methods for rigidly holding a magnet arranged on the outer periphery of a rotor core or a rotary shaft include those adapted to hold it by molding, using a non-magnetic member. For instance, Patent Document 1 (Jpn. Pat. Appln. Laid-Open Publication No. 5-153745) discloses a method of filling a non-magnetic member between magnets by die-casting. According to the Patent Document 1, magnets are rigidly fitted to a rotary shaft by adhesive and subsequently a ferromagnetic member is arranged around each of the magnets. Then, an aluminum die-casting material is filled between the magnets to rigidly secure the magnets onto a rotary shaft. Patent Document 2 (Jpn. Pat. Appln. Laid-Open Publication No. 9-19091) discloses a method of fixing a magnet to the outer periphery of a rotor core by integral molding, using synthetic resin. With the method of the Patent Document 2, the magnet is mechanically fixed to the rotor core without using any adhesive agent so that the time necessary for the fixing operation is reduced.

Patent Document 1: Jpn. Pat. Appln. Laid-Open Publication No. 5-153745)

Patent Document 2: Jpn. Pat. Appln. Laid-Open Publication No. 9-19091)

However, the method of rigidly fitting a magnet to a rotor core or the like by means of adhesive is accompanied by the following problems. Firstly, the coefficient of linear expansion of the rotor of such an electric rotary machine varies from component to component so that the magnet rigidly held by adhesive can become broken when it is heated to a high temperature level. The magnet, the multilayer core formed by using silicon steel plates, and the adhesive agent of the electric rotary machine normally show respective coefficients of linear expansion that are different from each other. Thus, they expand to respective extents that are different from each other as the temperature changes. Therefore, as the extent of expansion of the magnet becomes remarkably different from those of the adhesive agent and the multilayer core at high temperatures, the magnet is subjected to tensile force due to the different extents of expansion to consequently give rise to a broken magnet.

Secondly, when the magnet is rigidly held by means of adhesive, the bonding strength can be dispersed according to the bonding conditions and the quantity of the applied adhesive. Additionally, the adhesive agent can easily be degraded in a hot environment. Then, it is difficult to maintain the bonding strength to a desired level and hence the quality of the product may not be guaranteed. Furthermore, it is difficult to accurately bond the magnet. Accordingly, it is difficult to provide products with stable characteristics.

Thirdly, when an adhesive agent is used, the manufacturing cost rises because the cost of the manufacturing facility is high and the number of manufacturing steps is large. A process including steps of washing the surface to be bonded (degreasing), applying adhesive, bonding a magnet, hardening the adhesive (drying) and cooling (to the room temperature) is normally used for rigidly holding a magnet by means of adhesive. Then, a large number of facilities including a washing facility, an adhesive application facility and a hardening facility are required. Additionally, many man-hours are required because the manufacturing process involves a large number of steps, and the cooling step is particularly time consuming. The manufacturing cost rises as the investment for facilities and the number of man-hours increase, and improvements of the problems are called for.

While the Patent Document 2 discloses a magnet fixing method that does not use any adhesive agent, it requires a metal mold for rigidly holding the magnet by molding resin. In other words, the investment for facilities required for using this method may not differ significantly from the investment for facilities necessary for rigidly holding the magnet by adhesive so that the manufacturing cost is also high. Additionally, a specifically devised metal mold is required to hold a magnet at a predetermined position in the metal mold without using adhesive to consequently raise the cost of the metal mold so much.

The object of the present invention is to provide a magnet fixing structure that can accurately fix a magnet to a rotor core or the like at low cost.

SUMMARY OF THE INVENTION

A magnet fixing structure according to the present invention has a rotor core fixed to a rotary shaft and a plurality of magnets fitted to the rotor core on the outer periphery thereof along the peripheral direction. Holder anchoring sections are formed on the outer periphery of the rotor core at predetermined regular intervals along the peripheral direction; and a plurality of holder members are rigidly fitted respectively to the holder anchoring sections so as to extend along the rotary shaft. Magnet containing sections are each defined by two adjacently located ones of the holder members and the outer peripheral surface of the rotor core so as to receive a corresponding one of the magnets press-fitted therein in the direction of the rotary shaft.

Thus, in a magnet fixing structure according to the present invention, the holder members are rigidly fitted to the outer periphery of the rotor core and the magnets are press-fitted in the respective magnet containing sections formed by the holder members and the outer peripheral surface of the rotor core in the axial direction. The magnets are rigidly held to the outer peripheral surface of the rotor core by the elastic resiliency of the holder members without requiring the use of any adhesive agent. The holder members are rigidly fitted to the respective holder anchoring grooves so that the magnets are accurately and rigidly held to the respective positions on the rotor core.

A magnet fixing structure to be used for an electric rotary machine according to the present invention may be so arranged that a plurality of holder anchoring grooves are formed respectively in the holder anchoring sections so as to extend in the direction of the rotary shaft, and each of the holder members is made to show a substantially T-shaped cross section and have a main body section extending in the direction of the rotary shaft. An engaging projection is formed at the inner peripheral side of the main body so as to be engaged with and anchored to the corresponding one of the holder anchoring grooves, and a pair of magnet holding pieces is formed at the respective lateral sides of the main body section and extends in the peripheral direction so as to face the outer peripheral surface of the rotor core with a gap interposed between them. The holder members are rigidly anchored to the respective holder anchoring grooves by means of the engaging projections and the magnets are held in the respective magnet containing sections by the elastic resiliency of the magnet holding pieces.

Alternatively, a magnet fixing structure to be used for an electric rotary machine according to the present invention may be so arranged that holder anchoring projections are formed respectively in the holder anchoring sections so as to extend in the direction of the rotary shaft, and each of the holder members is made to show a substantially T-shaped cross section and have a main body section extending in the direction of the rotary shaft. An engaging groove is formed at the inner peripheral side of the main body so as to be engaged with and anchored to the corresponding one of the holder anchoring projections, and a pair of magnet holding pieces is formed at the respective lateral sides of the main body section and extends in the peripheral direction so as to face the outer peripheral surface of the rotor core with a gap interposed between them. The holder members are rigidly anchored to the respective holder anchoring projections by means of the engaging grooves and the magnets are held in the respective magnet containing sections by the elastic resiliency of the magnet holding pieces.

In a magnet fixing structure according to the present invention, each of the holder members may have first contact sections formed respectively on the magnet holding pieces so as to contact the corresponding ones of the magnets and second contact sections formed on the main body section so as to contact the corresponding ones of the magnets. With such an arrangement, the first contact sections can limit the movement, if any, of each of the magnets in the radial direction and the second contact sections can limit the movement, if any, of each of the magnets in the peripheral direction. The gap separating each of the first contact sections and the outer peripheral surface of the rotor core may be made smaller than the radial dimension of each of the magnets at the position where it contacts the first contact section. The distance separating the second contact sections facing each other at the magnet containing section may be made smaller than the peripheral dimension of each of the magnets.

In a magnet fixing structure according to the present invention, a non-contact area that does not contact a corresponding one of the magnets may be arranged between each of the first contact sections and the corresponding second contact sections of each of the holder members. Such non-contact areas reduce the stress generated in the magnets due to the difference in the press-fitting force applied to the magnets that is attributable to the dimensional tolerances of the magnets and thermal expansions of the magnets.

In a magnet fixing structure to be used for an electric rotary machine according to the present invention, it may be so arranged that the lateral edges of the holder members are located radially outside relative to the lateral edges of the magnets when the magnets are received respectively in the magnet containing sections. Then, a gap may be formed between the lateral edges of each of the magnets and the corresponding inner peripheral surface of the magnet cover fitted to the outside of the magnets. With such an arrangement, the inner peripheral surface of the magnet cover does not contact the magnets when the magnet cover is fitted to the outside of the magnets. Therefore, it is possible to fit the magnet cover without any risk of damaging the magnets.

In a magnet fixing structure to be used for an electric rotary machine according to the present invention, the holder members may be made to project from the holder base rigidly fitted to the rotary shaft.

Thus, as defined above, a magnet fixing structure for an electric rotary machine having a rotor core fixed to a rotary shaft and a plurality of magnets fitted to the rotor core on the outer periphery thereof along the peripheral direction according to the present invention comprises a plurality of holder anchoring grooves formed on the outer periphery of the rotor core at predetermined regular intervals along the peripheral direction. Holder members are rigidly fitted respectively to the holder anchoring grooves so as to extend along the rotary shaft and magnet containing sections, each defined by the adjacently located holder members and the outer peripheral surface of the rotor core so as to receive the magnets press-fitted therein in the direction of the rotary shaft. With this arrangement, the magnets are held in the respective magnet containing sections by the elastic resiliency of the magnet holder members so that it is possible to firmly anchor the magnets to the outer peripheral surface of the rotor core without using any adhesive agent.

Therefore, the magnets are prevented from being broken when an adhesive agent is used because of the difference in the coefficient of linear expansion of each component. Additionally, since no adhesive agent is used, the above-identified problem in that the bonding strength can be dispersed according to the bonding conditions and the quantity of the applied adhesive and the adhesive agent can easily be degraded in a hot environment has nothing to do with a magnet fixing structure according to the present invention so that it is possible to improve the quality of the product. Furthermore, since the holder members are aligned by the holder anchoring grooves, it is possible to accurately align and rigidly anchor the magnets to stabilize the product characteristics. Still additionally, according to the present invention, only by means of an assembling operation of press-fitting the magnets, neither the adhesive agent applying operation nor the time for hardening the adhesive agent in the assembling process is required to consequently reduce the number of manufacturing facilities, the man-hours, and hence the manufacturing cost.

In the magnet fixing structure according to the present invention, since first contact sections and second contact sections are formed and non-contact areas are provided between both sections in each of the holder members, it is possible to accommodate the change in the press-fitting force due to the dimensional tolerance of the magnets. In other words, if the magnets show dimensional dispersions, it is possible to press-fit the magnets into the respective magnet containing sections with a constant pushing force so that the magnets are prevented from being broken in the assembling process. Additionally, if the magnets expand by heat, the stress that may arise in the magnets due to the thermal expansion of the magnets is relieved. Thus, if the ambient temperature rises while the rotary machine is in operation and the magnets expand by heat, the magnets are not constrained tightly and the stress produced in the magnets can be relieved by the deformation constraint to prevent the magnet from being broken.

EXPLANATION OF REFERENCE SYMBOLS

1: brushless motor
2: rotor shaft
3: joint
4: motor section
5: sensor section
6: stator
7: rotor
8: hall element
11: drive coil
12: stator core
13: yoke
14: bracket
15a: bearing
16: rotor core
16a: outer peripheral surface
17: rotor magnet
18: side plate
19: magnet holder
20: sensor magnet
21: magnet cover
21a: small diameter section
21b: large diameter section
21c: tapered section
22: sensor holder
23: screw
24: printed circuit board
25: end cap
26: power supply cable
27: rubber grommet
31: holder base
32: holder arm (holder member)
33: sensor magnet fitting section
41: main body section
42: magnet holding piece
43: magnet containing section
44: engaging projection
45: holder anchoring groove (holder anchoring section)
45a: aperture
45b: bottom section
46: first contact section
47: second contact section
48: non-contact section
49: gap
51: holder anchoring projection (holder anchoring section)
51a: tip section
51b: base section
52: engaging groove
53, 53a, 53b: rotor
54: magnet holder
55: magnet holder

DETAILED DESCRIPTION OF THE INVENTION

Now, the present invention will be described in greater detail by referring to the accompanying drawings that illustrate preferred embodiments of the invention.

Embodiment 1

Figure 1:
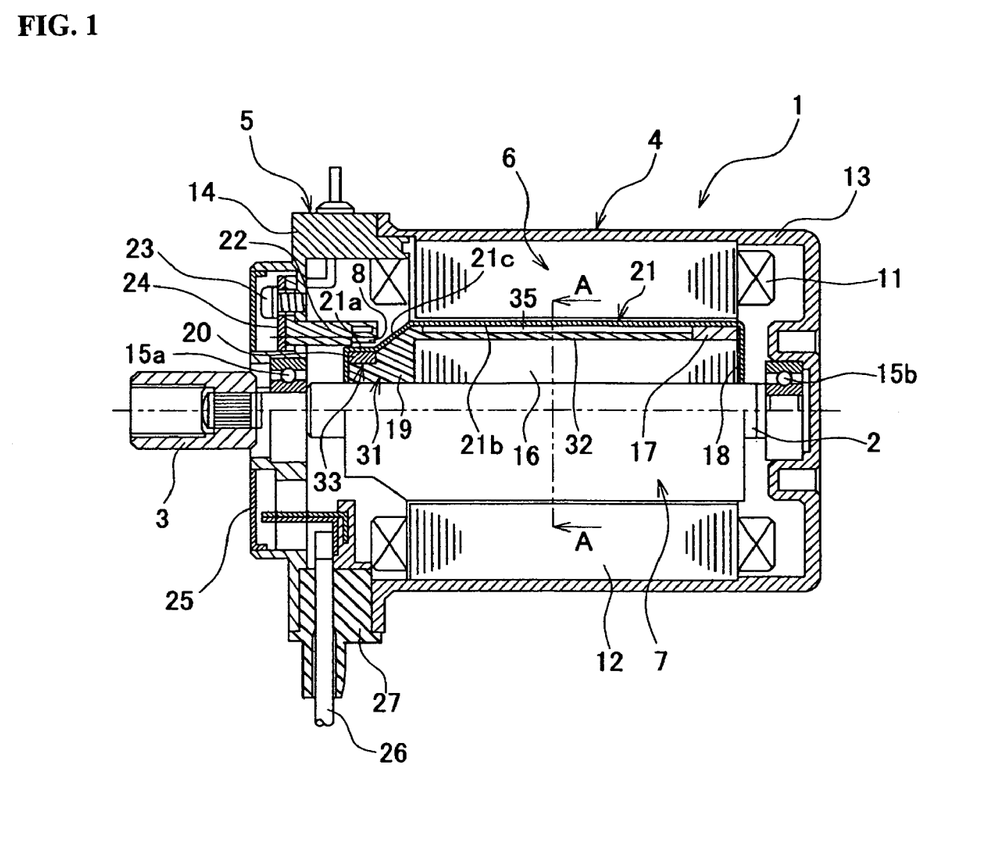
FIG. 1 is a schematic cross sectional view of a brushless motor realized by using a first embodiment of a magnet fixing structure according to the present invention.
Figure 2:
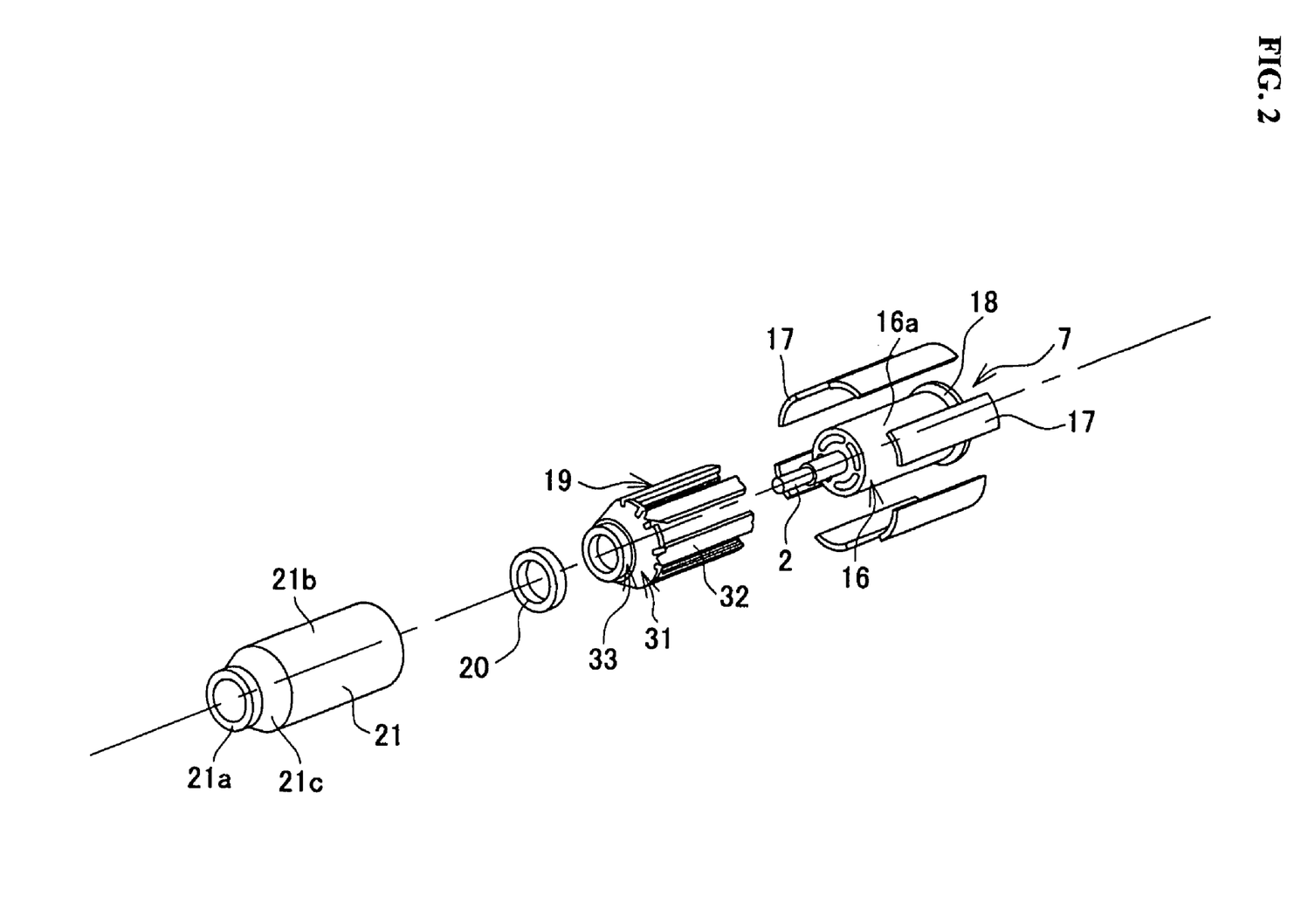
FIG. 2 is an exploded schematic perspective view of the brushless motor of FIG. 1.

FIG. 1 is a schematic cross sectional view of a brushless motor realized by using Embodiment 1 of a magnet fixing structure according to the present invention. FIG. 2 is an exploded schematic perspective view of the brushless motor of FIG. 1. The brushless motor (to be referred to simply as motor hereinafter) of FIGS. 1 and 2 is to be used as drive source for an EPS. The motor 1 supplies steering assisting power according to the steering angle and the running speed of the vehicle as the driver operates a steering wheel. The rotor shaft (rotary shaft) 2 of the motor 1 is linked to the input shaft of a gear box (not shown) by way of joint 3. The revolutions of the motor 1 are reduced appropriately in the gear box and subsequently transmitted to the steering column of the vehicle so that the steering power of the vehicle is assisted by the rotary power of the motor 1.

Roughly speaking, the motor 1 comprises a motor section 4 and a sensor section 5. The motor section 4 includes a stator 6 and a rotor 7 and the sensor section 5 includes hall elements (magnetism detection elements) 8. The rotor 7 is arranged at the inside of the stator 6 so as to be able to freely rotate. Thus, the motor 1 is a so-called inner rotor type brushless motor.

The stator 6 has a stator core 12 around which a drive coil 11 is wound and a metal-made yoke 13 for containing the stator core 12. The stator core 12 is formed by laying a number of metal plates that are made of a magnetic material one on the other. A salient pole is projecting at the inner peripheral side of the stator core 12 and a drive coil 11 is wound around the salient pole as winding. The yoke 13 has a bottomed cylindrical shape and is made of a magnetic material. A bracket 14 that is formed by aluminum die casting (or synthetic resin) is fitted to the open end side of the yoke 13.

A rotor shaft 2 is arranged in the rotor 7. The rotor shaft 2 is supported by bearings 15a, 15b fitted respectively to the yoke 13 and the bracket 14 so as to be able to freely rotate. A rotor core 16 is rigidly fitted to the rotor shaft 2. The rotor core 16 is formed by laying a number of metal plates made of a magnetic material one on the other. A total of six segment-shaped rotor magnets 17 are fitted to the outer periphery of the rotor core 16. A side plate 18 is fitted to an axial end of the rotor core 16.

Figure 3:
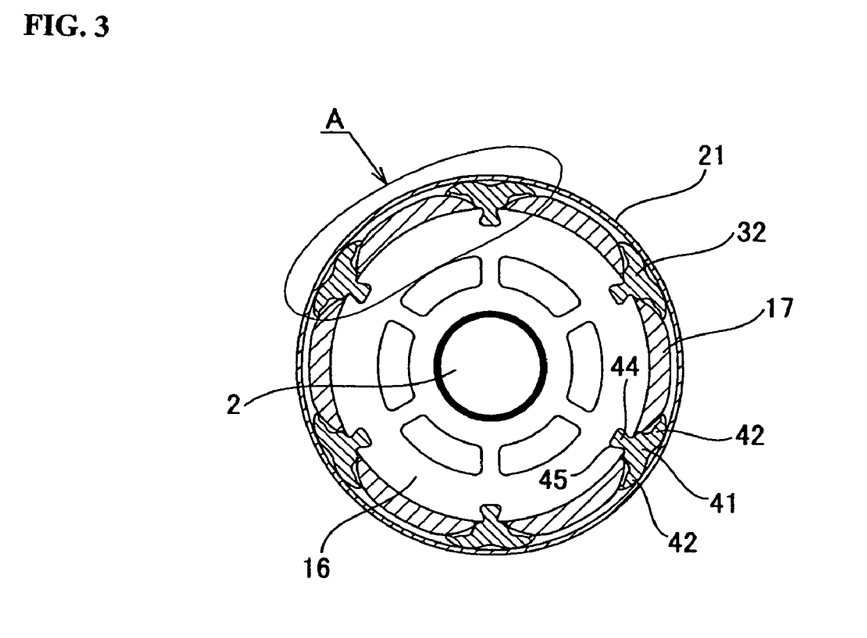
FIG. 3 is a schematic cross sectional view of the brushless motor of FIG. 1 taken along line A-A in FIG. 1.
Figure 4:
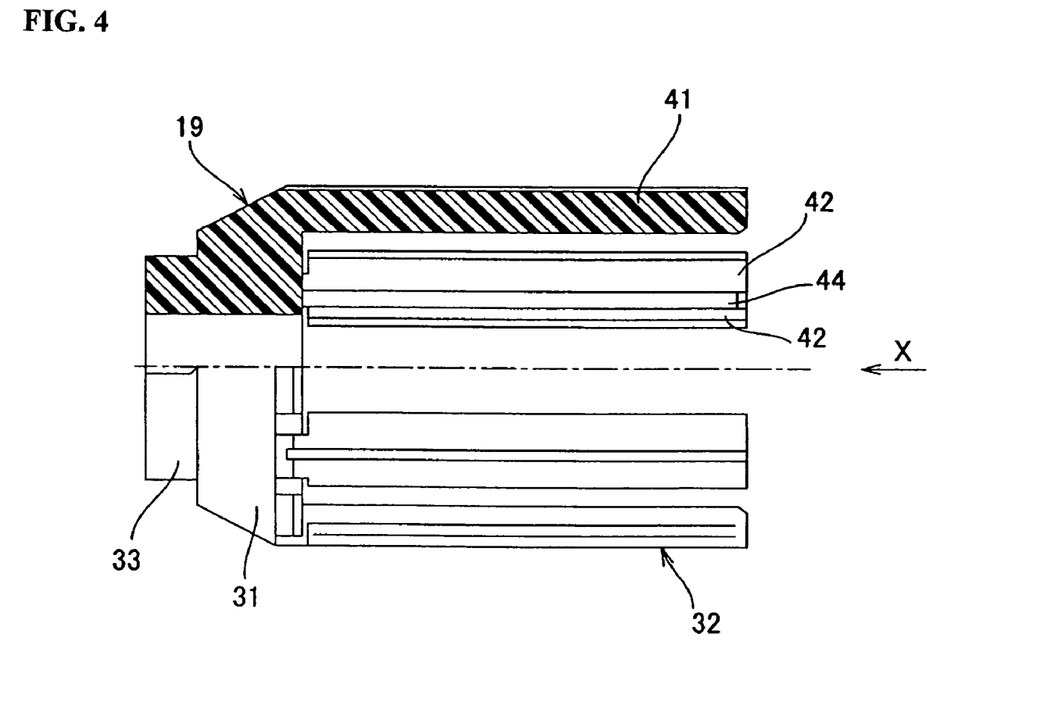
FIG. 4 is a schematic cross sectional view of the magnet holders.
Figure 5:
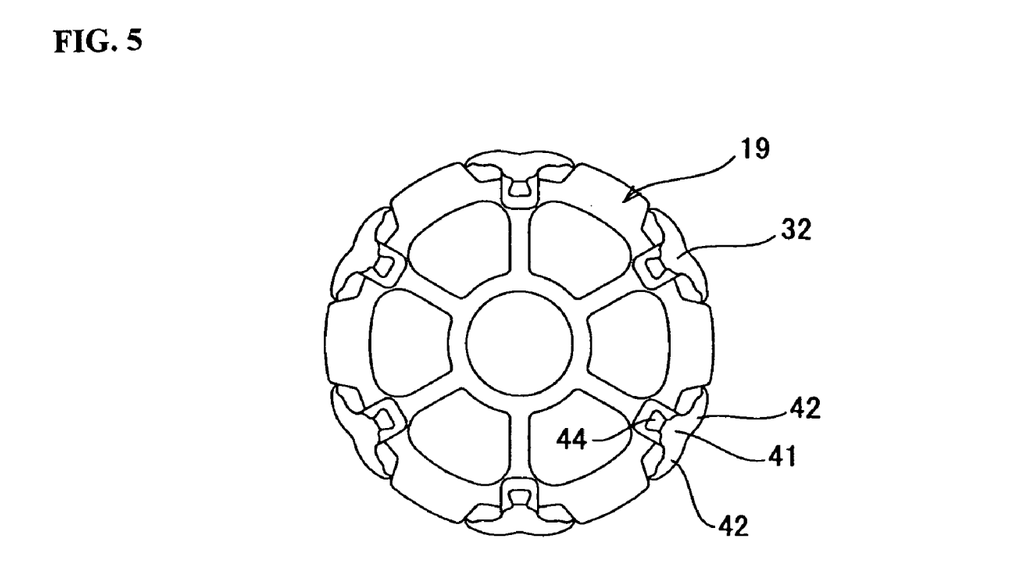
FIG. 5 is a schematic lateral view of the magnet holders of FIG. 4 as viewed in the direction of arrow X in FIG. 4.
Figure 6:
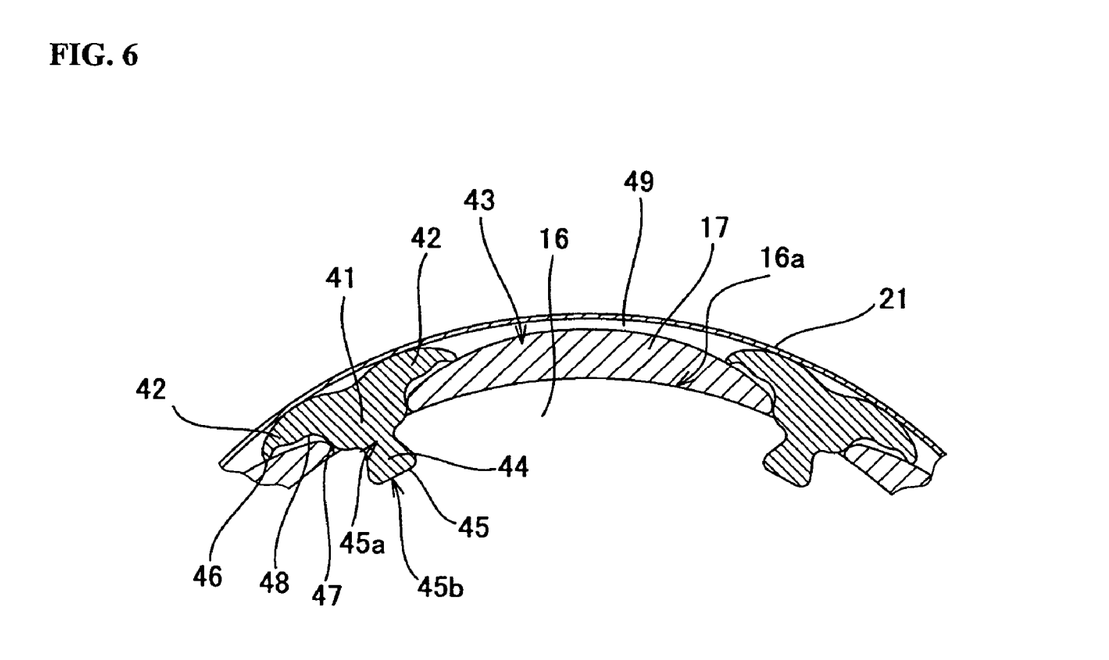
FIG. 6 is an enlarged schematic view of area A shown in FIG. 3.

Additionally, a magnet holder 19 that is made of synthetic resin is rigidly fitted to the rotor shaft 2. FIG. 3 is a schematic cross sectional view of the brushless motor of FIG. 1 taken along line A-A in FIG. 1. FIG. 4 is a schematic cross sectional view of the magnet holder 19. FIG. 5 is a schematic lateral view of the magnet holder 19 of FIG. 4 as viewed in the direction of arrow X in FIG. 4. FIG. 6 is an enlarged schematic view of area A shown in FIG. 3. As shown in FIG. 4, the magnet holder 19 includes a holder base 31 rigidly secured to the rotor shaft 2 and holder arms (holder members) 32 axially projecting from the holder base 31. A sensor magnet fitting section 33 is formed at the end of the holder base 31 by cutting the latter. A sensor magnet 20 is to be fitted to the sensor magnet fitting section 33.

Each of the holder arms 32 is a cantilever structure extending axially from the holder base 31. As shown in FIG. 6, each of the holder arms 32 has a substantially T-shaped cross section and a pair of magnet holding pieces 42 is formed at the respective lateral sides of the main body section 41 that extends in the axial direction. A magnet containing section 43 is defined by the magnet holding pieces 42 and by the outer peripheral surface 16a of the rotor core 16 between the magnet holding pieces 42 that are located adjacent to each other on the adjacently located holder arms 32. A segment-shaped rotor magnet 17 is axially put into the magnet containing section 43 by press-fitting and held in the latter.

An engaging projection 44 is formed at the inner peripheral side of the main body section 41. The engaging projection 44 is to be engaged with one of the holder anchoring groove (holder anchoring section) 45 formed on the outer peripheral part of the rotor core 16. The holder anchoring groove 45 extends along the axial direction of the rotary shaft (rotary shaft extending direction). A total of six holder anchoring grooves 45 are provided in the peripheral direction of the rotor core 16. The opening part 45a of each of the holder anchoring grooves 45 is made narrower than the bottom part 45b thereof. The engaging projection 44 is made to show a matching profile and hence has a substantially trapezoidal cross section. As the engaging projection 44 is put into the holder anchoring groove 45, the engaging projection 44 that has a substantially trapezoidal cross section becomes tightly engaged with the holder anchoring groove 45 and holder arm 32 is rigidly anchored to the outer peripheral surface 16a of the rotor core 16 and is prevented from being released in the radial direction.

As shown in FIG. 6, the magnet holding pieces 42 extend in the peripheral direction from the main body section 41 so as to face the outer peripheral surface 16a of the rotor core 16 with a gap interposed between them. A first contact section 46 (located at a distal end of each magnet holding piece 42) is arranged at the front end of each of the magnet holding pieces 42. As a rotor magnet 17 is put into the corresponding magnet containing section 43, the first contact section 46 contacts a first portion of the outer peripheral surface of the rotor magnet 17. A second contact section 47 (located at a base end of each magnet holding piece 42) is arranged on the main body section 41 and it projects in the peripheral direction. As the rotor magnet 17 is put into the magnet containing section 43, the second contact section 47 contacts a second portion of the outer peripheral surface of the rotor magnet 17. A non-contact area 48 that does not contact the rotor magnet 17 is arranged between the first contact section 46 and the second contact section 47 to produce a gap between itself and the rotor magnet 17.

The rotor magnets 17 are fitted to the rotor core 16 that is rigidly secured to the rotor shaft 2 and the magnet holder 19 from the free end side (the right end side in FIG. 4) of the holder arms 32. The gap between each of the first contact sections 46 and the outer peripheral surface 16a of the rotor core 16 is made to be slightly smaller than the thickness (radial dimension) of the corresponding part of the corresponding rotor magnet 17 to be fitted thereto when the related magnet holding pieces 42 are free. The distance separating the two second contact sections 47 of adjacent holder arms 32 that are arranged to define the magnet containing section 43 is made to be slightly smaller than the width of the rotor magnet 17. Thus, the rotor magnet 17 is put into the magnet containing section 43 in the axial direction as it forces to push open the corresponding magnet holding pieces 42 outwardly and the corresponding main body sections 41 peripherally (sideways) by press-fitting.

The rotor magnet 17 press-fitted into the corresponding magnet containing section 43 is held in it by the elastic resiliency of the magnet holding pieces 42 and the main body sections 41. In this condition, the radial movement, if any, of the rotor magnet 17 is limited by the corresponding first contact sections 46 whereas the peripheral movement, if any, of the rotor magnet 17 is limited by the corresponding second contact sections 47. In other words, the rotor magnet 17 is rigidly held to the outer peripheral surface 16a of the rotor core 16 by the elastic resiliency of the magnet holder 19 without any adhesive agent. Thus, the magnet is free from the tensile force that is produced due to the different extents of expansion of the components operating on the rotor magnet 17 when adhesive is used and hence from the risk of being broken due to the difference in the coefficient of linear expansion.

Additionally, the rotor magnet 17 is supported by the first and second contact sections 46, 47, and a non-contact area 48 is arranged between them. Therefore, if the ambient temperature rises when the motor is in operation and the rotor magnet 17 thermally expands, the rotor magnet 17 is not constrained firmly by the holder arms 32. Therefore, the stress that is produced in the rotor magnet due to thermal deformation and constraint can be alleviated to prevent the magnet from being broken.

Furthermore, since no adhesive agent is used, there arises no problem due to the dispersion of bonding strength according to the bonding conditions and the quantity of the applied adhesive and the degradation of the adhesive agent in a hot environment so that the product quality will be improved. Since the holder arms 32 are aligned by the holder anchoring grooves 45, it is possible to accurately align and anchor the magnets and stabilize the product characteristics. No anti-rotation mechanism is required when aligning the magnets so that the manufacturing facilities can be simplified and the man-hours, can be reduced. Additionally, since the motor is assembled only by means of an assembling operation of press-fitting the rotor magnets 17, neither the adhesive agent in the assembling process applying operation nor the time for hardening the adhesive agent is required to reduce the number of manufacturing facilities, the man-hours and hence the manufacturing cost that otherwise includes the cost of the adhesive agent.

Meanwhile, the rotor magnets 17 generally require a large dimensional tolerance and, when rare earth magnets are used for the rotor magnets 17, the magnets can rust when the surfaces of the magnets are scarred. Thus, it is necessary to avoid excessive press-fitting force to be applied to the rotor magnets 17 into the respective magnet containing sections 43, although a sufficient level of pressure is required to hold the rotor magnets 17 there. In view of these circumstances, in a magnet fixing structure according to the present invention, the cross sectional view of the magnet containing sections 43 is differentiated from that of the rotor magnets 17 to accommodate the change in the press-fitting force due to the large dimensional tolerance required by the magnets, because the first and second contact sections 46, 47 support the rotor magnets 17 at the two points and the non-contact area 48 is arranged between them. In other words, if the rotor magnets 17 show dimensional dispersions, it is possible to press-fit the rotor magnets 17 into the respective magnet containing sections 43 with a constant pushing force so that the magnets are prevented from being broken in the assembling process.

A ring-shaped sensor magnet 20 is fitted to the sensor magnet fitting section 33. The sensor magnet fitting section 33 is formed at the end of the holder base 31 (left end side in FIG. 4) by cutting the latter to form a step. The sensor magnet 20 is to be fitted to the sensor magnet fitting section 33 from the outside. The polarities of the sensor magnet 20 correspond to those of the rotor magnets 17, the number of poles of the sensor magnet 20 being the same as those of the rotor magnets 17, and are arranged at the same positions as those of the rotor magnets 17 as viewed in the peripheral direction. In the case of the above-described motor 1, six rotor magnets 17 are provided and hence the sensor magnet 20 is made to have six magnetic poles in the peripheral direction.

The magnet holder 19 is covered by a magnet cover 21 from the outside. The magnet cover 21 is made of a non-magnetic material such as stainless steel or aluminum and formed by deep drawing. The magnet cover 21 is provided with a small diameter section 21a for covering the sensor magnet 20 and a large diameter section 21b for covering the rotor magnets 17. A tapered section 21c is arranged between the small diameter section 21a and the large diameter section 21b.

The magnet cover 21 is fitted to the magnet holder 19 carrying the rotor magnets 17 and the sensor magnet 20 from the side of the holder base 31. The inner diameter of the magnet cover 21 is made slightly smaller than the outer diameter of the holder arms 32 when the latter are put together. In other words, the magnet cover 21 is fitted to the outside of magnet holder 19 by a sort of press-fitting. Note, however, that the outer diameter of the rotor magnets 17 is smaller than the inner diameter of the magnet cover 21 when they are fitted to the outer peripheral surface 16a of the rotor core 16.

In other words, when the rotor magnets 17 are fitted to the respective magnet containing sections 43, the outer peripheral surfaces of the holder arms 32 are located radially outside the outer peripheral surfaces of the rotor magnets 17. Therefore, a gap 49 is formed between the top section of each of the rotor magnets 17 and the inner peripheral surface of the magnet cover 21 as shown in FIG. 6. Thus, when the magnet cover 21 is put in position by press-fitting, the inner peripheral surface of the magnet cover 21 does not contact the rotor magnets 17 and hence the magnet cover 21 can be fitted in position without damaging any of the rotor magnets 17.

In the above-described motor 1, the rotor magnets 17 are anchored to the magnet holder 19 without the magnet cover 21. However, the magnet cover 21 is arranged at the outside of the rotor magnets 17 from the viewpoint of reliability so as to prevent the motor from falling into a locked condition when any of the rotor magnets 17 comes off or is broken. As the magnet cover 21 is put in position by a sort of press-fitting, the magnet holding pieces 42 are pressed further against the corresponding rotor magnets 17 to more rigidly hold the latter.

Hall elements 8 are arranged radially outside of the sensor magnet 20 at the side of the sensor section 5. A total of three hall elements 8 for the U-, V- and W-phases are provided, and there is one hall element per each of the phases. The hall elements 8 are arranged with respect to the sensor magnet 20 at regular intervals. The polarities of the sensor magnet 20 correspond to those of the rotor magnets 17, the number of poles of the sensor magnet 20 being the same as those of the rotor magnets 17, and are arranged at positions the same as those of the rotor magnets 17 as viewed in the peripheral direction. Then, the sensor magnet 20 is rigidly held by the magnet cover 21. As described above, both the rotor magnets 17 and the sensor magnet 20 are magnetized to show six poles in the motor 1. The hall elements 8 send out signals according to the polarity changes of the sensor magnets 20 so that the rotary position of the rotor 7 is detected according to those signals.

The hall elements 8 are arranged peripherally at the front end of a sensor holder 22 fitted to the bracket 14. A printed circuit board 24 is fitted to the outside of the sensor holder 22. Both the sensor holder 22 and the printed circuit board 24 are rigidly fitted to the bracket 14 by screws 23. An end cap 25 is fitted to the outer end of the bracket 14 to protect the parts of the printed circuit board 24 and other elements contained in the bracket 14 from the external atmosphere. A power supply cable 26 is also connected to the bracket 14 in order to supply power to the drive coil 11. The power supply cable 26 is lead out of the motor by way of a rubber grommet 27 fitted to the lateral side of the bracket 14.

While a sensor magnet 20 and hall elements 8 are used to detect the rotary position of the rotor 7 in the above-described first embodiment, they may be replaced by a resolver rotor and a resolver. If such is the case, the resolver rotor is fitted to a position similar to that of the sensor magnet 20. The resolver rotor is rigidly fitted to the rotor shaft 2. Then, sensor magnet fitting section 33, the small diameter section 21a and the tapered section 21c are taken away form the magnet holder 19 and the magnet cover 21. The resolver is arranged at the position of the hall elements 8 on the bracket 14.

Embodiment 2

Figure 7:
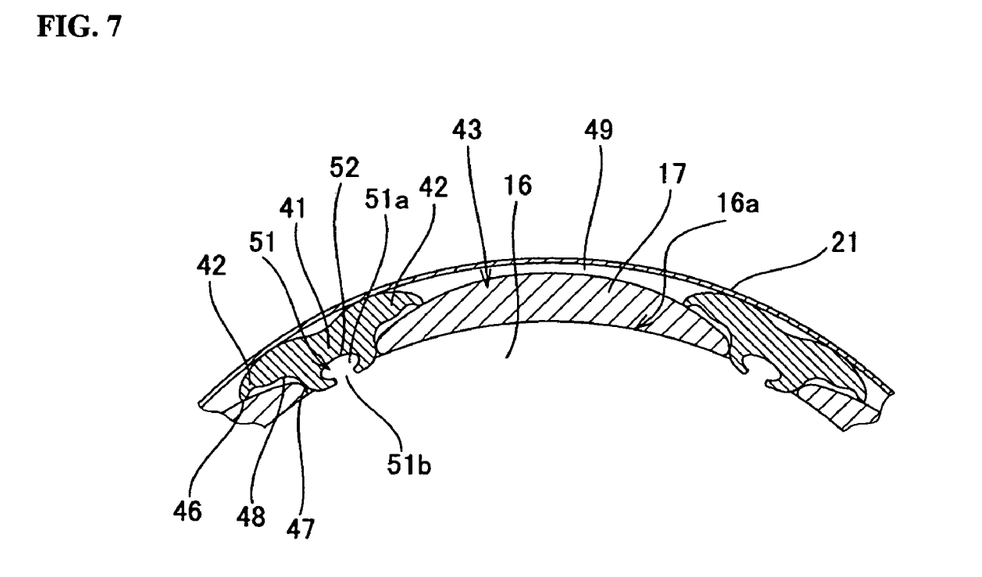
FIG. 7 is an enlarged schematic cross sectional view of a second embodiment of a magnet fixing structure according to the present invention.

Embodiment 2 of the present invention differs from Embodiment 1 in that the projections and the grooves of the engagement arrangement of the magnet fixing structure are inverted. FIG. 7 is an enlarged schematic cross sectional view of the second embodiment of a magnet fixing structure according to the present invention. In the following embodiments, the components which are the same as or similar to those of the first embodiment are denoted respectively by the same reference symbols and will not be described further.

Holder anchoring projections 51 are formed on the outer periphery of the rotor core 16 for the holder anchoring sections of this embodiment. The holder anchoring projections 51 extend along the rotary shaft. A total of six holder anchoring projections 51 are arranged peripherally at regular intervals. The front end part 51a of each of the holder anchoring projections 51 is made broader than the base part 51b thereof. On the other hand, each holder arm 32 has a substantially T-shaped cross section as shown in FIG. 7. A pair of magnet holding pieces 42 is formed at the respective lateral sides of the main body section 41 of the holder arm 32 that extends axially. In this case again, a magnet containing section 43 is defined by the facing magnet holding pieces 42 of adjacently located holder arm 32 and the outer peripheral surface 16a of the rotor core 16.

An engaging groove 52 is formed on the inner peripheral side of the main body section 41 of the holder arms 32. The engaging groove 52 is brought into engagement with a corresponding one of the holder anchoring projections 51 on the outer peripheral surface of the rotor core. The opening part of each of the engaging grooves 52 is made narrower than the bottom part thereof to match the profile of the holder engaging projection 51. Thus, as each of the holder arms 32 is put in the axial direction by putting the corresponding holder anchoring projection 51 into the engaging groove 52, the engaging groove 52 and the holder anchoring projection 51 become tightly engaged with each other. As a result, the holder arm 32 is anchored to the outer peripheral surface 16a of the rotor core 16 and prevented from being released in the radial direction.

A pair of magnet holding pieces 42 is arranged at the respective lateral sides of the main body section 41. The magnet holding pieces 42 extend in the peripheral direction from the main body section 41 so as to face the outer peripheral surface 16a of the rotor core 16 with a gap interposed between them. A first contact section 46 is arranged at the front end of each of the magnet holding pieces 42. A second contact section 47 is projected from the main body section 41. A non-contact area 48 is formed between the first contact section 46 and the second contact section 47. Thus, as a rotor magnet 17 is put into the corresponding magnet containing section 43, the first contact section 46 and the second contact section 47 come to contact the outer peripheral surface of the rotor magnet 17.

Embodiment 3

Figure 8:
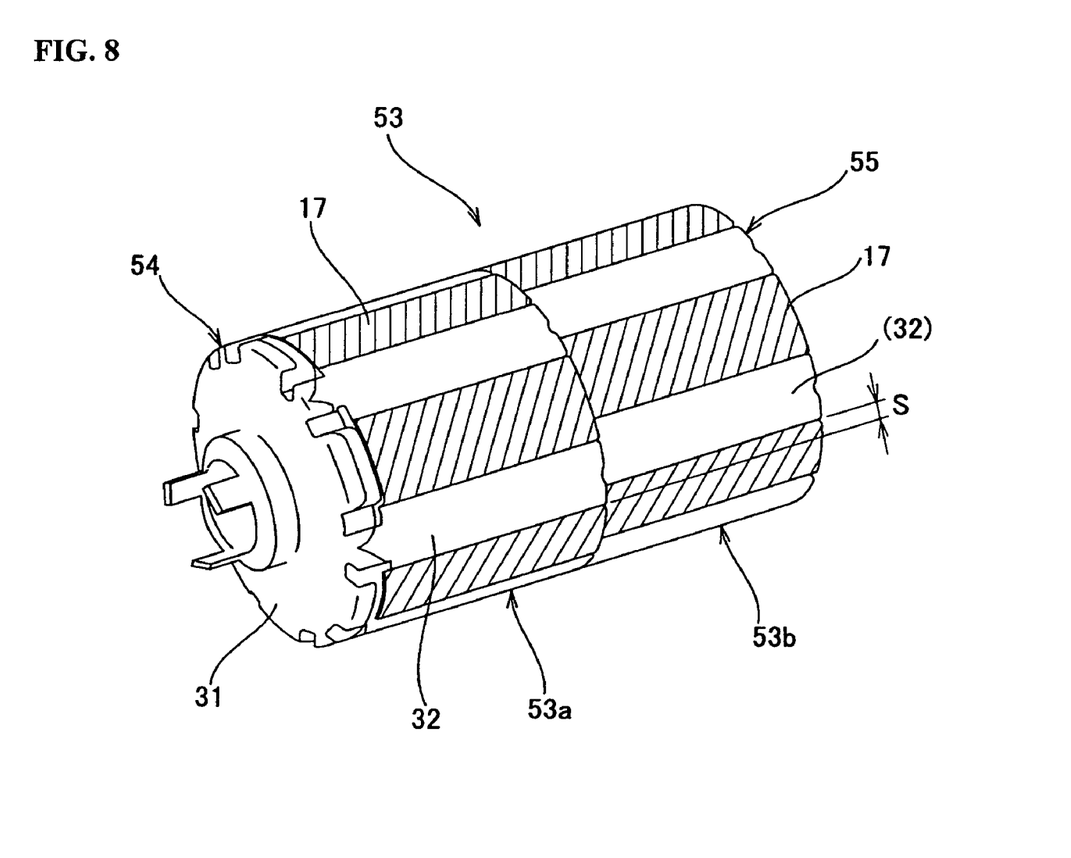
FIG. 8 is a schematic cross sectional view of a brushless motor where the rotor magnets are skewed by means of a magnet fixing structure according to the present invention.

Embodiment 3 differs from Embodiment 1 in that the rotor magnets 17 are radially skewed by using a magnet fixing structure similar to that of the first embodiment. FIG. 8 is a schematic cross sectional view of the brushless motor where the rotor magnets are skewed.

Of the rotor 53 of FIG. 8, the rotor magnets 17 indicated by hatching are skewed to step aside (be offset) in the radial direction between the front half and the rear half thereof. Note that a resolver is used for the rotor 53 as described in the last part of the description of Embodiment 1. Magnet holder 54 is used for the front rotor 53a whereas magnet holder 55 is used for the rear rotor 53b. The magnet holder 54 is realized by axially reducing the length of the holder arms 32 of the magnet holder 19 of Embodiment 1. On the other hand, the magnet holder 55 does not have any holder base 31 of the magnet holder 19. In other words, the magnet holder 55 has only holder arms 32.

The rotors 53a, 53b are formed separately. For the rotor 53a, the magnet holder 54 is fitted to the rotor core 16 and the rotor magnets 17 are put into and anchored to it by press-fitting. For the rotor 53b, the magnet holder 55 is fitted to the rotor core 16 that is different from the rotor core 16 of the rotor 53a and the rotor magnets 17 are put into and anchored to it by press-fitting. After the rotors 53a, 53b are formed, they are rigidly secured to the rotor shaft 2. The rotor magnets 17 of the rotor 53a are skewed (offset) radially relative to those of the rotor 53b. As a result, a rotor 53 where the rotor magnets 17 are skewed to step aside (be offset) by a distance S between the front half and the rear half is produced.

A magnet holder 19 similar to that of Example 1 may alternatively be used also for the rotor 53b to make both the rotor 53a and the rotor 53b have the same structure. Then, the rotors 53a, 53b are rigidly secured to the rotor shaft 2 with the free ends of the holder arms 32 of the rotor 53a respectively abutting the corresponding free ends of the rotor 53b. A skew structure having three or more than three steps can be realized by using a plurality of rotors 53b. Such skewed rotor can be formed by using magnet fixing structures similar to that of Embodiment 2.

The present invention is by no means limited to the above-described embodiments, which may be modified and altered in various different ways without departing from the spirit and scope of the present invention.

For example, while a magnet fixing structure according to the present invention is applied to an inner rotor type brushless motor in each of the above-described embodiments, it can also be applied to a motor having one or more than one brush and an electric generator. While rotor magnets 17 can be fixed to a rotor core 16 without using any adhesive according to the present invention, a small amount of adhesive may be used to bond the rotor magnets 17 to the rotor core 16. While an adhesive agent is used in the manufacturing process, the amount of adhesive is reduced if compared with an arrangement of bonding rotor magnets 17 only by means of adhesive so that the time required for hardening the adhesive can be remarkably reduced.

The invention claimed is:

1. A magnet fixing structure for an electric rotary machine including a rotor core fixed to a rotary shaft and a plurality of magnets fitted to an outer periphery of the rotor core, said magnet fixing structure comprising:

holder anchoring sections formed at regular intervals along the outer periphery of the rotor core;

a plurality of holder members, each of said holder members being rigidly fitted to a respective one of said holder anchoring sections so as to extend along a longitudinal axis of the rotary shaft; and a plurality of magnet containing sections, each of said magnet containing sections being defined by an adjacent pair of said holder members and an outer peripheral surface of the rotor core so as to receive a respective one of the magnets press-fitted therein along the longitudinal axis of the rotary shaft;

wherein each of said holder members has a T-shaped cross section having a main body extending along the longitudinal axis of the rotary shaft, and having a pair of magnet holding pieces extending outwardly from opposite lateral sides of said main body in a peripheral direction of the rotor core such that a gap is defined between each of said pair of magnet holding pieces and an outer peripheral surface of the rotor core, each of said magnet holding pieces being configured so as to have a first contact section for contacting a first portion of a respective one of the magnets, a second contact section for contacting a second portion of the respective one of the magnets, and a non-contact section between said first contact section and said second contact section shaped so as not to contact the respective one of the magnets.

2. The magnet fixing structure of claim 1, wherein said holder anchoring sections each comprise a respective holder anchoring groove extending along the longitudinal axis of the rotary shaft, each of said holder members further having an engaging projection at an inner peripheral side of said main body to be engaged with and anchored to a corresponding holder anchoring groove of one of said holder anchoring sections.

3. The magnet fixing structure of claim 1, wherein said holder anchoring sections each comprise a respective holder anchoring projection extending along the longitudinal axis of the rotary shaft, each of said holder members further having an engaging groove at an inner peripheral side of said main body to be engaged with and anchored to a corresponding holder anchoring projection of one of said holder anchoring sections.

4. The magnet fixing structure of claim 1, wherein said first contact section of each of said magnet holding pieces is configured and located to limit movement of the respective one of the magnets in a radial direction of the rotor core, and said second contact section of each of said magnet holding pieces is configured and located to limit movement of the respective one of the magnets in the peripheral direction of the rotor core.

5. The magnet fixing structure of claim 1, wherein said first contact section is located at a distal end of a respective one of said magnet holding pieces, and said second contact section is located at a base end of said respective one of said magnet holding pieces, said non-contact section of said respective one of said magnet holding pieces being located between said distal end and said base end and configured so as to allow movement of the respective one of the magnets as the rotor core thermally expands to thereby alleviate stress in the respective one of the magnets.

6. The magnet fixing structure of claim 1, wherein lateral edges of each of said holder members are located radially outside relative to lateral edges of the magnets when the magnets are press-fitted in said magnet containing sections.

7. The magnet fixing structure of claim 6, further comprising a magnet cover fitted radially outside of said holder members and the magnets, said magnet cover being configured such that a gap is formed between the lateral edges of each of the magnets and a corresponding inner peripheral surface portion of said magnet cover, and such that said holder members are pressed against the magnets by said magnet cover.

8. The magnet fixing structure of claim 1, further comprising a holder base to be fitted to the rotary shaft, said holder members projecting axially from said holder base.

9. The magnet fixing structure of claim 1, wherein said holder anchoring sections each comprise a respective holder anchoring groove extending along the longitudinal axis of the rotary shaft, said holder anchoring groove of each of said holder anchoring sections having a wide section and a narrow section, each of said holder members further having an engaging projection projecting from an inner peripheral side of said main body, said engaging projection of each of said holder members having a wide section and a narrow section located between said wide section of said engaging projection and said main body, said wide section of said engaging projection being wider than said narrow section of said holder anchoring groove such that, when said wide section of said engaging projection is located in said wide section of said holder anchoring groove, said engaging projection anchors a respective one of said holder members to said holder anchoring groove.

10. The magnet fixing structure of claim 1, wherein said holder anchoring sections each comprise a respective holder anchoring projection extending along the longitudinal axis of the rotary shaft, said holder anchoring projection of each of said holder anchoring sections having a wide section and a narrow section, each of said holder members further having an engaging groove in an inner peripheral side of said main body, said engaging groove of each of said holder members having a wide section and a narrow section located between said wide section of said engaging groove and said inner peripheral side of said main body, said wide section of said holder anchoring projection being wider than said narrow section of said engaging groove such that, when said wide section of said holder anchoring projection is located in said wide section of said engaging groove, said holder anchoring projection anchors a respective one of said holder members to said holder anchoring projection.

* * * * *